3,586,664
XYLOSE DERIVATIVES AND PREPARATION THEREOF

Shigeharu Kohno and Isao Yamatsu, Tokyo, Japan, assignors to Eisai Kabushiki Kaisha, Bunkyo-ku, Tokyo, Japan
No Drawing. Filed Mar. 19, 1969, Ser. No. 808,648
Int. Cl. C07c 47/18
U.S. Cl. 260—210R — 5 Claims

ABSTRACT OF THE DISCLOSURE

New and novel xylose derivatives and preparation thereof, represented by the general formula

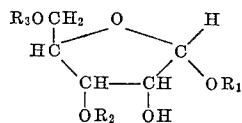

wherein $R_1$ is an alkyl or aralkyl radical having more than two carbon atoms and each of $R_2$ and $R_3$ is an alkyl, aralkyl or aracyl radical. The new xylose derivatives are effective for medical treatment of inflammation and edema caused by acetylcholine, histamine and bradykinin.

---

This invention relates to a process for the synthetic preparation of new and novel xylose derivatives, i.e., xylofuranoside represented by the general formula

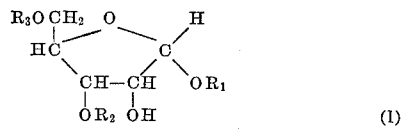

(1)

wherein $R_1$ is an alkyl or aralkyl radical having more than two carbon atoms and each of $R_2$ and $R_3$ is an alkyl, aralkyl or aracyl radical.

New compounds of the above Formula I exhibit a strong antagonism against acetylcholine, histamine and bradykinin. The compounds therefore can advantageously be employed for medical treatment of inflammation and edema caused by acetylcholine, histamine and bradykinin.

Results of pharmacological tests carried out on animals of ethyl 3,5-dibenzyl-D-xylofuranoside (Compound-A), a typical one obtained according to the process of the present invention, are shown below.

(a) Antagonistic effects of Compound-A against contractions of the intestinal canal removed from guinea pig according to Magnus method:

| Substance applied | Concentration (S/ml.) | Antagonistic effect (percent) of Compound-A | |
|---|---|---|---|
| | | (30 S/ml.) | (100 S/ml.) |
| Histamine | 0.1 | 90 | 100 |
| Acetylcholine | 0.1 | 25 | 100 |
| Bradykinin | 0.1 | 95 | 100 |

(b) Repressive effect of Compound-A on dextran edema of guinea pig:

| Compound | mg./kg., i.p. | Effect observed after administration | Repressive effect (percent) |
|---|---|---|---|
| Control | | | 0 |
| Compound-A | 100 | 0.5 | [1] 16 |
| | | 1 | [1] 17 |
| | | 2 | 4 |
| | | 3 | 2 |
| Do | 300 | 0.5 | [1] 18 |
| | | 1 | [1] 24 |
| | | 2 | [1] 21 |
| | | 3 | [1] 17 |

[1] At P=0.05, a significant effect was observed as compared with control

As is evident from the abovementioned tests, the new compounds obtained by the process of the present invention are effective as antiflammatory-antiedematous agent.

The new compounds of the present invention are prepared according to the following reaction.

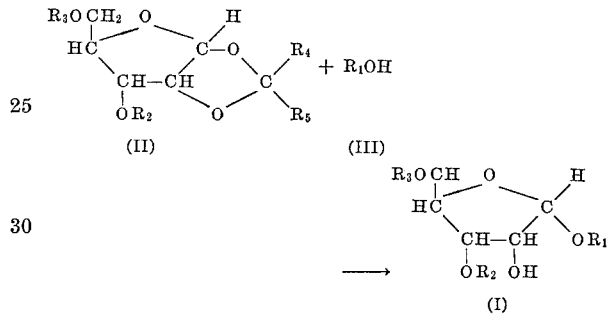

In the formulae, $R_1$, $R_2$ and $R_3$ have the same meanings as those defined in the aforementioned Formula I, and $R_4$ and $R_5$ are lower alkyl radicals.

The aforementioned reaction is effectively carried out by heating a solution of the compound (II) in an alcohol (III) containing dry hydrogen chloride, for example, neutralizing the reaction mixture with a weak alkaline substance such as basic lead carbonate or sodium bicarbonate, filtering, concentrating the filtrate and distilling in vacuo the residue to obtain the compound.

The following examples will illustrate the invention.

EXAMPLE 1

Production of ethyl 3,5-dibenzyl-D-xylofuranoside 13 grams of 3,5-dibenzyl-1,2-isopropylidene xylofuranose were refluxed with stirring in 120 ml. of 1% ethanolic hydrogen chloride solution for one and half an hour. The reaction mixture was neutralized with basic lead carbonate and filtered. Upon concentration of the filtrate, the residue was subjected to vacuum distillation and collected a fraction boiling at 205°–207° C./0.3 mm./Hg. There was thus obtained the compound aimed at.

Analysis.—$C_{21}H_{26}O_5$: Calculation (percent): C, 70.42; H, 7.26. Found (percent): C, 70.48; H, 7.19.

3,5-dibenzyl-1,2-isopropylidene xylofuranose employed as the starting material in the above example was prepared as follows:

21.5 grams of 1,2-isopropylidene-D-xylofuranose were dissolved in 250 ml. of benzyl chloride. To the solution were added 100 grams of pulverized potassium hydroxide and the whole was heated to 80° C. for 5 hours. The reaction mixture was poured onto ice-water, extracted with a sufficient amount of chloroform. The extract was concentrated by distillation in order to remove the solvent. The residue was then distilled under reduced pressure and a fraction boiling at 200°–203° C./0.3 mm./Hg was collected.

EXAMPLE 2

Preparation of n-propyl-3,5-dibenzyl-D-xylofuranoside 13 grams of 3,5-dibenzyl-1,2-isopropylidene-D-xylofuranose were reacted with 120 ml. of 1% propanolic hydrogen chloride solution in accordance with the procedure disclosed in the preceding example. The fraction boiling at 205°–207° C./0.05 mm./Hg was thus obtained as the product aimed at.

*Analysis.*—$C_{22}H_{28}O_5$: Calculation (percent): C, 71.00; H, 7.51. Found (percent): C, 70.48; H, 7.19.

EXAMPLE 3

Preparation of 1,3,5-tribenzyl-D-xylofuranoside 10 grams of 3,5-dibenzyl-1,2-isopropylidene-D-xylofuranose were dissolved in 120 ml. of benzyl alcoholic hydrogen chloride solution. The solution was further worked up in accordance with the procedure disclosed in Example 1.

A fraction boiling at 236°–237° C./0.1 mm./Hg was collected as the compound aimed at.

*Analysis.*—$C_{26}H_{28}O_5$: Calculation (percent): C, 74.31; H, 6.67. Found (percent): C, 74.00; H, 6.72.

EXAMPLE 4

Preparation of ethyl 3,5-dibenzoyl-D-xylofuranoside 10 grams of 3,5-dibenzoyl-1,2-isopropylidene-D-xylofuranose were dissolved in 110 ml. of 1% ethanolic hydrogen chloride solution. The solution was further worked up in accordance with the procedure disclosed in Example 1.

Analysis of the product thus obtained was as follows: $C_{21}H_{22}O_7$.—Calculation (percent): C, 62.98; H, 6.07. Found (percent): C, 62.79; H, 5.96.

What we claim is:

1. A xylofuranoside represented by the general formula

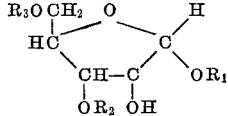

wherein $R_1$ is a lower alkyl radical containing at least two carbon atoms or benzyl radical and each of $R_2$ and $R_3$ groups is a lower alkyl, benzyl or benzoyl radical.

2. A xylofuranoside compound according to claim 1, namely, ethyl 3,5-dibenzyl-D-xylofuranoside.

3. A xylofuranoside compound according to claim 1, namely, n-propyl-3,5-dibenzyl-D-xylofuranoside.

4. A xylofuranoside compound according to claim 1, namely, 1,3,5-tribenzyl-D-xylofuranoside.

5. A compound according to claim 1, namely, ethyl 3,5-dibenzoyl-D-xylofuranoside.

References Cited

UNITED STATES PATENTS

| | | | |
|---|---|---|---|
| 2,235,786 | 3/1941 | White | 260—210 |
| 3,073,788 | 1/1963 | Hostettler et al. | 260—210 |
| 3,419,544 | 12/1968 | Witzel et al. | 260—210 |

LEWIS GOTTS, Primary Examiner

J. R. BROWN, Assistant Examiner

U.S. Cl. X.R.

424—180